United States Patent [19]

Bush et al.

[11] Patent Number: 4,835,123

[45] Date of Patent: May 30, 1989

[54] MAGNESIA PARTIALLY-STABILIZED ZIRCONIA

[75] Inventors: Edward A. Bush, Painted Post; K. Pattabhirami Reddy, Corning; Louis S. Socha, Jr., Painted Post, all of N.Y.

[73] Assignee: Didier-Werke AG, Wiesbaden, Fed. Rep. of Germany

[21] Appl. No.: 183,914

[22] Filed: Apr. 20, 1988

Related U.S. Application Data

[63] Continuation of Ser. No. 825,515, Feb. 3, 1986, abandoned.

[51] Int. Cl.$^4$ .............................................. C04B 35/48
[52] U.S. Cl. .................................... 501/104; 501/103; 264/65
[58] Field of Search ............... 501/103, 104, 105, 152; 264/65

[56] References Cited

U.S. PATENT DOCUMENTS

| | | | |
|---|---|---|---|
| 2,578,748 | 12/1951 | Schoenlaub | 106/57 |
| 2,937,102 | 5/1960 | Wagner | 106/57 |
| 3,365,317 | 1/1968 | Yavorsky | 106/57 |
| 3,887,387 | 6/1975 | Sturhahn | 106/57 |
| 4,279,655 | 7/1981 | Garvie et al. | 106/57 |
| 4,659,680 | 4/1987 | Guile | 501/103 X |

FOREIGN PATENT DOCUMENTS

| | | | |
|---|---|---|---|
| 60-161374 | 7/1985 | Japan . | |
| 2149773A | 12/1975 | United Kingdom | 106/57 |
| WO8304247 | 12/1983 | World Int. Prop. O. | 106/57 |

OTHER PUBLICATIONS

James F. Shackelford et al., Influence of SiO$_2$ on Sintering of Partially Stabilized Zirconia, Amer. Ceram. Soc. Bulletin, vol. 53, No. 12 (1974), pp. 865–867.
L. J. Schioler et al., Effect of Overaging on the Room–Temperature Strength of Partially Stabilized Zirconia, Amer. Ceram. Soc. Bulletin 64, No. 2 (1985), pp. 626–327.
R. T. Pasco et al., "Strengthening and Microstructural Changes in Magnesia Zirconia Alloys", Science of Ceramics, vol. 9, pp. 447–454, 1977.
R. H. J. Hannink et al., "Sub-eutectoid Aged Mg–PSZ Alloy with Enhanced Thermal Up–Shock Resistance", Journal of Materials Science, vol. 17, 1982, pp. 2637–2643.
R. H. J. Hannink et al., Magnesia–Partially Stabilized Zirconia: The Influence of Heat Treatment on Thermomechanical Properties Journal of the Australian Ceramic Society, vol. 18 No. 2.
Hans H. Sturhahn et al., "Application and Properties of Sintered Zirconia", Ber. Dt. Keram., vol. 52 (1975), pp. 59–62.
R. H. J. Hannink et al., "Microstructural Development of Subeutectoid Aged MgO–ZrO$_2$ Alloys", Journal of Materials Science, vol 18 (1983), pp. 457–470.
G. Wahlberg et al., "The Intergranular Microstructure of a Partially Stabilized ZrO$_2$ Material", Journal of Materials Science Letter, vol. 4 (1985) pp. 1353–1355.
A. K. Tjernlund et al., "Influence of Combustion Atmospheres on the Phase Transformation of Zirconia", Journal of Materials Science Letters, vol. 5, Feb. 1986, pp. 120–131.
Lishing Li et al., "Influence of High Temperature On the Strength of Partially Stabilized ZrO$_2$ Materials", Ber. Dt. Kerm., vol. 55 (1978), pp. 494–493.
"Microstructural Development in MgO–Partially Stabilized Zirconia (Mg-PSZ)", D. L. Porter and A. H. Heuer, Journal of the American Ceramic Society, vol. 62, No. 5–6, pp. 298–304.
"Mechanisms of Toughening Partially Stabilized Zirconia (PSZ)", D. L. Porter and A. H. Heuer, Journal of the American Ceramic Society–Discussions and Notes, Mar.–Apr. 1977, vol. 60, No. 3–4, pp. 183–184.
"Sintering Aids For Partially Stabilized Zirconia–", J. Drennan and R. H. J. Hannink, J. Aust. Ceram. Ass., 1984, pp. 36–37.
"Mechanical Strengthening of Alumina– and Zirconia–Ceramics Through the Introduction of Secondary Phases", U. Dworak, H. Olapinski and G. Thamerus, Science of Ceramics, No. 9, 1977, pp. 542–550.
"Influenced of Microstructure of Al$_2$O$_3$ and ZrO$_2$ on K$_{IC}$", N. Claussen, R. Pabst. and C. P. Lahmann, Proc. Brit. Ceramic. Society, No. 25, 1975, pp. 139–149.
"High Temperature Properties of Dispersion Ceramics Containing Stabilized Tetragonal Phase", Li–shing Li, H. Olapinski, R. F. Pabst, Science of Ceramics, 1980, vol. 10, pp. 569–576.
"High Temperature Reactions of MgO Doped PSZ", Lishing Li and R. F. Pabst, Special Ceramics, No. 9, pp. 55–63.
"High Temperature Fracture Toughness Measurments and Acing Processes of PSZ", Lishing Li and R. F. Pabst, Fracture Mechanics of Ceramics, No. 6, 1983, pp. 371–381.
"Long–Term Stability and Properties of Zirconia Ceramics for Heavy Duty Diesel Engine Components", David C. Larsen and Jane E. Adams, U.S. Department of Energy, Sep. 1985, pp. iii–30, 127–135, 203–219.

*Primary Examiner*—William R. Dixon, Jr.
*Assistant Examiner*—Karl Group
*Attorney, Agent, or Firm*—Gary H. Levin; Norman L. Norris; Richard N. Wardell

[57] ABSTRACT

Magnesia partially-stabilized zirconia ceramic materials can be prepared from "unpurified" zirconia which contains at least about 0.05 weight percent silica. Despite the relatively high silica content, a thermal shock resistant material can be produced by a firing schedule which includes heating to a top temperature at a specified rate and cooling back to room temperature at specified rates and which incorporates a thermal aging step at 1000–1200° C. Differences in microstructure and monoclinic zirconia content, with consequent differences in physical properties of the ceramic material, can be attained by variations in the firing and thermal-aging schedules.

18 Claims, No Drawings

MAGNESIA PARTIALLY-STABILIZED ZIRCONIA

BACKGROUND OF THE INVENTION

This invention relates to refractory articles of zirconia partially stabilized with magnesia and particularly to articles which can be made from zirconia of relatively high silica content. The zirconia articles have high strength and toughness at both normal and elevated temperatures, and display good thermal shock resistance over the temperature ranges that prevail at many of the applications to which ceramic refractory articles are normally put.

Because of the sharp volume change undergone by zirconia during its monoclinic/tetragonal transformations, unstabilized zirconia is not generally useful for articles exposed to temperature fluctuations through the range at which the transformation occurs. Consequently, certain stabilizers have been added to and reacted with zirconia to stabilize it, at least partially, in its cubic crystalline form throughout these temperature ranges. Zirconia is "wholly" or "partially" stabilized depending on whether the amount of stabilizer is sufficient to form the cubic phase solid solution with all or part of the zirconia. Partial stabilization is generally sufficient to overcome the destructive thermally-induced volume changes in zirconia. Magnesia, one of the best stabilizers, is effective to partially stabilize zirconia to the desired degree of thermal shock resistance at levels as low as about 2.5–4.0 percent by weight.

One of the important uses for partially stabilized zirconia is as an extrusion die for the high speed, high-temperature extrusion of both ferrous and non-ferrous metals. In this application, extrusion temperatures and pressures can reach 1250° C. and 1500 MPa, respectively. The high stress to which the die material is subjected is evident, and accordingly the material must be physically strong to avoid cracking from thermal and mechanical stresses.

One particularly strong, thermally stable magnesia partially-stabilized zirconia (MgO-PSZ) is shown in U.S. Pat. No. 4,279,655 (Garvie et al; July 21, 1981). The zirconia there disclosed is stabilized with about 2.8–4.0 weight percent magnesia, and through a specific schedule for firing, cooling, and thermal-aging, develops a microstructure characterized by a matrix of grains of cubic-stabilized zirconia wherein each grain contains discrete precipitates of monoclinic zirconia and tetragonal zirconia. This microstructure imparts strength, toughness, and thermal shock resistance, over a wide temperature range.

The reference further teaches, however, that the zirconium dioxide powder from which the stabilized zirconia is prepared must be highly pure, containing no more than about 0.03 weight percent silica, in order for the method of that invention to impart the desired properties to the final zirconia body. This requirement can present practical disadvantages in that the silica level in most commercially available zirconia dioxide powders exceeds that stated maximum. For example, ZIRCOA A (monoclinic) zirconia powder, now available from Corning Glass Works, Corning, N.Y., and made according to U.S. Pat. No. 2,578,748, generally contains from about 0.05–0.5 weight percent silica. Calcia as well as other oxides can also be present in minor amounts as shown in Table 1. The more readily available zirconia powders generally do not meet the purity requirement of U.S. Pat. No. 4,279,655.

TABLE 1

| Chemical Analysis of Typical ZIRCOA-A Zirconia Powder | |
|---|---|
| | Wt. % |
| $ZrO_2$* | 99.60 |
| $SiO_2$ | 0.10 |
| $CaO$ | 0.17 |
| $MgO$ | 0.01 |
| $TiO_2$ | 0.04 |
| $Al_2O_3$ | 0.02 |
| $Fe_2O_3$ | 0.04 |

*with $HfO_2$ as natural impurity

Published U.K. Patent Application No. 2,149,773A discloses MgO-PSZ which does contain 0.8–1.5 percent silica. The fired zirconia articles of this publication, however, are not prepared with the aforementioned specific cooling and thermal-aging sequence discussed above, and are not disclosed to attain the beneficial microstructure as a result. Published PCT Application No. WO83/04247 discloses that zirconia powder not meeting the purity requirements of U.S. Pat. No. 4,279,655 can nonetheless be processed according to the method of that patent to attain the desired partially-stabilized microstructure provided that a special additive is introduced to the composition. Specifically, it is disclosed that up to 1.0 weight percent silica is acceptable in the final products when 0.05–1.0 weight percent of a special "additive" (a metal oxide, preferably strontia, baria, or a rare earth oxide, which forms an insoluble zirconate that does not combine with magnesia) is added to the batch before firing. The presence of the additive, however, generally requires prolonged aging time, and the extra cost of that aging, and the possible reduction in high-temperature strength, are disadvantages of this method and composition.

It is therefore an object of the present invention to provide a zirconia ceramic, partially stabilized with magnesia, which has the strength, toughness, and thermal shock resistance imparted by a precipitate-containing microstructure and which can be prepared, if desired, from the readily available batch $ZrO_2$ powders without the need to introduce special additives or to further purify the batch by removal of silica.

SUMMARY OF THE INVENTION

A zirconia body, partially stabilized with magnesia, and a method of preparing the body, are provided. The partially stabilized zirconia body consists essentially of crystalline zirconia, silica, and magnesia, the silica being about 0.05–0.5% by weight of the body, and the magnesia being about 2.5–4.0% by weight of the body; said body having a crystalline microstructure consisting essentially of (1) grains of cubic stabilized zirconia comprising zirconia and a major portion of the magnesia, (2) discrete precipitates of tetragonal zirconia within the cubic grains, said precipitates having a substantially ellipsoidal shape with a long dimension of about 0.1–0.4 micron, (3) discrete precipitates of monoclinic zirconia within the cubic grains, said precipitates having a substantially ellipsoidal shape with a long dimension of about 0.1–0.4 micron, and (4) monoclinic zirconia at the boundaries of the cubic grains. The partially stabilized zirconia of the body is characterized by (a) having a microstructure wherein the monoclinic zirconia content is about 10–20 volume percent, having a thermal expansion coefficient over the range of 25°–1000° C. of about $(65-105) \times 10^{-7}/°C.$, and retaining a modulus of rupture of at least 400 MPa, measured at 25° C., after exposure to a defined thermal shock test; or (b) having a microstructure wherein the monoclinic zirconia content is about 20–60 volume percent, having a thermal expansion coefficient over the range of 25°–1000° C. of about $(10-65) \times 10^{-7}/°C.$, and retaining a modulus of rupture of at least 250 MPa, measured at 25° C., after exposure to a defined thermal shock test.

The zirconia body of the present invention has a crystalline microstructure which can take one of two forms: low monoclinic zirconia content (about 10–20 volume percent) characterized by good physical properties, such as toughness and modulus of rupture, at temperatures from about room temperature (25° C.) to about 400° C.; and high monoclinic zirconia content (about 20–60 volume percent) characterized by good physical properties at temperatures up to about 1000° C. Both forms of the zirconia have excellent thermal shock resistance.

The method of preparing the body comprises specific heating and cooling schedules, including a thermal-aging step, which develop the desired microstructure. The different crystalline forms can be obtained by varying the firing and cooling schedules, including the thermal-aging step, in the preparation of the products. The zirconia bodies thus formed can be tailored to a wide range of applications which take advantage of the high strength, toughness, refractoriness, thermal shock resistance, high density, and low thermal conductivity, which partially-stabilized zirconia exhibits. The zirconia bodies of the present invention, particularly those of high monoclinic zirconia content, are especially useful as extrusion die nibs for high-temperature metal processing. Die nibs made of these zirconias can withstand the severe thermo-mechanical stresses associated with high speed extrusion and also provide an excellent surface finish to the extruded products.

DETAILED DESCRIPTION OF THE INVENTION

The present invention is based in part on the surprising finding that partially stabilized zirconia bodies having both good physical properties and thermal shock resistance can be prepared from zirconia powders which need not be purified to a low (0.03 weight percent or below) silica content. The zirconia bodies provided by the present invention are partially stabilized with magnesia and are characterized by a microstructure of cubic grains of stabilized zirconia which can be separated by monoclinic zirconia at the cubic grain boundaries and which contain discrete precipitates of tetragonal-phase and monoclinic-phase zirconia.

The crystalline microstructure and physical properties of the present zirconia bodies are qualitatively similar to those described in U.S. Pat. No. 4,279,655 (issued to Garvie et al). Surpisingly, however, the microstructure and the physical properties have been attained in the present invention despite levels of silica greater than those taught by Garvie et al to be acceptable. It has also been found that the presence of additives such as those described in PCT Application No. WO83/04247 (published Dec. 8, 1983) is not required to scavenge the silica. Those additives are described as metal oxides which form insoluble zirconates, which do not combine with MgO, and which form a glass with silica. The zirconia materials of the present invention contain no such metal oxides, particularly not in the amounts indicated by that reference (0.05–1.0 weight percent), but contain levels of silica which were previously shown to prevent the development of good thermal shock resistance despite thermal aging at 1100° C., which aging was generally considered to be necessary to obtain both thermal shock resistance and good strength/toughness in a single material; see, for example, U.S. Pat. No. 4,279,655 at column 11, lines 58–68, and Table 2 at column 12.

The unexpected ability to develop not only good physical properties but also thermal shock resistance despite the presence of high silica levels permits the usage of more common, less expensive zirconia powders and eliminates the need to further purify the zirconia to lower the silica content. Accordingly, many readily-available commercial zirconia powders, which contain at least about 0.05 weight percent silica, can be used directly in the preparation of the zirconia bodies of this invention. For example, ZIRCOA-A zirconia powder, which is made according to the process of U.S. Pat. No. 2,578,748 and which is now available from Corning Glass Works, typically contains 0.05–0.25 weight percent silica, although levels as high as 0.5% are not uncommon. See Table 1, presented earlier.

In addition to silica, the zirconia powders produced by the process of U.S. Pat. No. 2,578,748 can also contain minor amounts, up to about 0.25% by weight each but generally less, of other oxides such as calcia, magnesia, titania, alumina, and iron oxide. Any one or all of these other oxides can be absent altogether, however. The zirconia starting material preferred for use in the present invention is made according to the teachings of U.S. Pat. No. 2,578,748, which is hereby incorporated by reference, although zirconia powders from other sources can be used as well.

According to the present invention, the zirconia bodies consist essentially of crystalline zirconia, partially stabilized with magnesia, and further contain silica. The magnesia content is about 2.5–4.0 percent by weight, preferably about 3.0 to 4.0 percent by weight, and most preferably about 3.0–3.5 percent by weight. Silica is present in amounts of at least 0.05 weight percent up to about 1.0 weight percent, but a content of no greater than 0.5 weight percent, preferably no greater than about 0.25 weight percent, is more desirable.

The zirconia bodies are characterized by a crystalline microstructure consisting essentially of grains of cubic zirconia, stabilized with magnesia; discrete precipitates of tetragonal phase zirconia within the cubic grains; discrete precipitates of monoclinic-phase zirconia within the cubic grains; and monoclinic zirconia at the boundaries of the cubic grains. The grains of cubic zirconia normally have a diameter in the range of about 20–100 microns. The precipitates within the grains are generally ellipsoidal or "lens-shaped", having a long dimension of about 0.1–0.4 micron, preferably 0.1–0.3 micron. The grains of cubic stabilized material, inclusive of the precipitates dispersed within them, constitute the major volumetric phase of the microstructure, accounting for at least about 75 volume percent, of the microstructure, with the grain boundary phase and porosity within the body constituting the volumetric balance of the microstructure.

In general, substantially all the cubic stabilized zirconia will be in the form of the cubic grains, substantially all the tetragonal zirconia will be in the form of precipitates within those grains, and the monoclinic zirconia will be present either in the precipitates within the cubic grains or in the grain boundary layer, with the major portion in the former. A major portion of the magnesia is in the cubic grains, incorporated in solid solution with the cubic stabilized zirconia. Some of the magnesia is in the grain boundary material, dispersed within the monoclinic zirconia. The silica is substantially all in the grain boundary layers, forming a silicate phase with the magnesia.

Surprisingly, it has been found that the physical properties of the zirconia bodies do not vary greatly with variations in the silica content up to about 0.5 weight percent, even in the absence of a silica-compensating additive. This is demonstrated by Examples 3 and 4 below, and is in contrast to the teachings of U.S. Pat. No. 4,279,655 and published PCT Application No. WO83/04247. Stabilizing oxides such as the "additives" described in the PCT Application are substantially absent from the present invention, by which it is meant that those oxides, even if present at all as impurities in the batch are at levels below 0.05 weight percent, the lower level of efficacy taught by the PCT Application. In this regard, the term "consisting essentially of" as used in this specification is intened to have its ordinarily accepted meaning—that minor amounts of components other than those specified as being within the invention may be present so long as those components do not interact with the specified components and change the basic characteristics and features of the invention. For example, oxides such as calcia, titania, or alumina may be present, but oxides which act as the additives of the PCT Application by forming insoluble zirconates and silicates are meant to be excluded or substantially absent.

The fired zirconia bodies of the invention can take either of two compositional forms, characterized herein with reference to the resultant monoclinic zirconia content, as "low monoclinic" and "high monoclinic" forms. The final form is generally controlled by the firing schedule applied in preparation of the zirconia body, discussed more fully below, and the forms are further characterized by somewhat different physical properties, making each suitable for somewhat different end-use applications.

Measurement of the monoclinic crystalline zirconia phase in the final zirconia body can be determined on a polished surface prepared using 6-micron diamond paste according to the method described in Garvie, R.C. and Nicholson, P.S., "Phase Analysis in Zirconia Systems", Journal of the American Ceramic Society, 55 (6) 303–305 (1972).

The low-monoclinic zirconia bodies generally have about 10–20 volume percent of monoclinic zirconia and are characterized by good physical properties over a temperature range of room temperature up to about 400°–500° C., and by excellent thermal shock resistance. More particularly, the low-monoclinic zirconia bodies have a room temperature toughness greater than about 9 MPa.m$^{.5}$, typically about 9–12 MPa.m$^{.5}$ (mega-pascals x square root meters), and a toughness at 800° C. of about 3–6 MPa.m$^{.5}$. The modulus of rupture (MOR) at room temperature is generally greater than about 500 MPa, and MOR at 800° C. is generally greater than 250 MPa, and typically in the range of 300–350 MPa. After-firing density is about 5.3–5.9 gm/cc. The thermal expansion coefficient of this form of the zirconia over the range of 25°–1000° C. is about $(65-105) \times 10^{-7}$/°C. After exposure to thermal shock, the low-monoclinic zirconia form of this invention retains a room temperature MOR of greater than about 400 MPa, and in general retains about 75% of the "pre-shock" MOR.

In general, thermal shock resistance is a measure of the ability of a material to withstand large, rapid temperature fluctuations without cracking or substantial loss of strenght. As used herein, the "exposure" of a zirconia material to "thermal shock" is defined as follows: A fired bar of the material is finished to size 3 by 3 by 65 mm on a grinder having a 320-grit diamond wheel. The sample bars, after having been originally brought to room temperature, are alternately immersed in a bath of molten tin maintained at 900° C. for 15 seconds, and removed from the bath for 2 minutes during which they are exposed to a stream of forced air at room temperature, followed by re-immersion in the bath. This procedure is followed through 3 immersions, after the last of which the bars are allowed to cool to room temperature. The modulus of rupture of sample bars is determined, at 25° C., both before and after the immersion cycle.

Examples of applications for which the low-monoclinic zirconia bodies of the invention can be used are valve guides and cylinder liners of engines, dies for powder extrusion or hot aluminum metal extrusion, and parts for pumps in contact with hot liquids and non-ferrous liquid metals.

The high-monoclinic zirconia bodies of the invention generally contain about 20–60 volume percent monoclinic zirconia and are characterized by superior high-temperature physical properties and excellent thermal shock resistance, making them suitable for applications in which temperatures of up to about 1000°–1200° C. are encountered. More particularly, the high-monoclinic zirconia body has a room temperature toughness greater than about 5 MPa.m$^{.5}$ and a toughness at 800° C. greater than about 4 MPa.m$^{.5}$. MOR at room temperature and 800° C. is generally greater than about 300 MPa, typically in the range of about 350–450 MPa. A room temperature MOR of greater than 250 MPa is retained after exposure to thermal shock, and in general about 75% of the "pre-shock" MOR is retained. After-firing density is about 5.3–5.9 gm/cc. The thermal expansion coefficient of the high-monoclinic zirconia bodies is about $(10-65) \times 10^{-7}$/°C. over the range 25°–1000° C.

End-use applications for the high-monoclinic zirconia bodies are, for example, extrusion dies for brass or copper, or for ferrous or titanium metals, engine components, and parts for pumps in contact with liquid metals. The high-monoclinic zirconia body is particularly preferred for use as a die for extrusion of copper-beryllium alloys and ferrous metals, such as stainless steel.

The method by which the zirconia bodies of the invention are prepared comprises a firing schedule, including a thermal aging step, which is in large part determinative of the crystalline microstructure ultimately obtained by the bodies. The schedule is generally described in U.S. Pat. No. 4,279,655 (issued July 21, 1981, to Garvie et al), which is hereby incorporated by reference. Broadly, the method of the present invention includes the steps of (a) preparing a "green" body, including general mixing and wet-milling of the zirconia and the magnesia powders and molding into the desired shape; (b) firing the green body to a sintering temperature of 1525°–1800° C.; (c) cooling the fired body to a first cooling temperature of about 1300°–1450° C. at a first cooling rate; (d) further cooling the body to a second cooling temperature in the range of about 1000°–1200° C. at a second cooling rate and optionally aging the body at that second cooling temperature; (e) cooling the body to room temperature; and optionally (f) heating the body to a temperature in the range of about 1000°–1200° C. and aging the body at that temperature such that the total aging time in steps (d) and (f) is 10–150 hours; and (g) cooling the body to room temperature.

Preparation of the green body is accomplished by methods normally practiced in the ceramics art. Zirconia and magnesia powders are mixed in proportions to provide a magnesia content of about 2.5–4.0% by weight. The magnesia can be added as a precursor compound which is heat-decomposable to magnesia, such as an oxalate, acetate, nitrate, fluoride, sulfate, carbonate, or hydroxide of magnesium. The amount of magnesia precursor used is such that it will generate a magnesia content within the above range. After mixing, the powders are wet-milled with water or an inorganic liquid to an average particle size of about 0.5–2.0 microns, preferably about 0.7–1.7 microns, and most preferably about 1.0 micron. The wet milling step is preferably performed in the presence of a deflocculant such as Darvan 7, a sodium polyacrylate, or Darvan C, an ammonium polyacrylate (R.T. Vanderbilt Co.), or Strodex PK-90, a potassium salt of a complex organic polyphosphoric ester acid anhydride (Dexter Chemical Corp.). Darvan C is a preferred deflocculant. Following milling, about 2–5% by weight of an organic binder is added, and the mixture is dried by spray drying or evaporation. It has been found that crazing of the final zirconia body can be eliminated or substantially reduced when the level of Strodex PK-90, an alkali-and phosphorous-containing deflocculating agent in the milling mixture is no more than about 0.5% by weight of the solids. The resulting powder is then pressed into the desired shape.

The sintering temperature to which the green body is fired depends on the magnesia content of the zirconia body. Preferably, the sintering temperature is one at which the material forms a substantially single-phase homogeneous cubic crystalline system. The temperature can be determined from a magnesia/zirconia phase diagram, but generally that temperature is in the range of 1525°–1800° C. for the magnesia levels described herein, with the higher temperatures corresponding to the lower magnesia levels. For the most preferred magnesia levels of 3.0–3.5 weight percent, temperatures of about 1550°–1750° C. can be used, with a temperature of about 1625°–1675° C. being most preferred for a magnesia level of about 3.3 weight percent. The sintering temperature is preferably reached by heating the body at a rate of about 50° C./hour, although this rate is not critical. The body optionally can be held at that temperature for up to 20 hours. The size of the cubic zirconia grains depends in large part on the hold time at the top temperature, with longer hold times normally resulting in larger grain size. In general, a smaller grain size is preferred for better strength of the fired body, and for that reason a top temperature hold time of under about 5 hours, preferably about 2 hours, is used.

When an organic binder is present, it is preferred to heat the green bodies slowly to about 400° C. to "burn out" the binder. A preferred heating schedule by which to accomplish this includes heating the green body to a temperature of about 250° C. over a 4-hour period, holding the body at that temperature for about 2 hours, heating the body to about 400° C. over a 6-hour period, and maintaining the body at that temperature for about 4 hours. Following this, the body is fired to its top, sintering temperature as described earlier.

Following the sintering step, the body is cooled from its top temperature to a first cooling temperature in the range of about 1300°–1450° C., most preferably about 1400° C. Cooling is effected at a rate of about 150°–600° C./hour, preferably about 200°–450° C./hour. Optionally, the cooling schedule may contain a hold period at the first cooling temperature of up to about 3 hours.

In step (d) of the invention, the body is further cooled to a second cooling temperature in the range of about 1000°–1200° C. This cooling step is carried out at a rate of about 20°–200° C./hour. A rate of about 50°–100° C./hour, particularly about 75° C./hour, is preferred, when the MgO content is about 3.3% by weight. In general, the rate of cooling within the stated range is dependent on the amount of MgO in the body. Bodies having lower MgO content require more rapid cooling, with the converse true as well. A hold period of up to 150 hours can also be optionally introduced at this second cooling temperature. Thermal aging in this temperature range is necessary at some point in the processing of the zirconia bodies to develop the monoclinic content in the structure. Accordingly, that aging can be introduced during this step (d) or, as discussed below, during an alternately optional re-heating step (f).

Cooling steps (c) and (d), particularly the latter step during which the body is cooled from the first cooling temperature to the second cooling temperature, are important to the development of the proper crystalline microstructure. At cooling rates slower than those described, the tetragonal precipitates grow larger and may exceed the preferred upper limit of about 0.4 micron. Tetragonal precipitates that exceed this size can transform spontaneously to the monoclinic form during cooling, causing the zirconia body to lose the "transformation toughening" characteristic. Similarly, cooling more quickly than the rates advised herein can produce tetragonal precipitates of less than the desired size, resulting in low toughness.

According to step (e) of the invention, the body is further cooled to room temperature. Any convenient cooling rate up to about 400° C./hour can be used in this step, although cooling rates below about 300° C./hour are preferred to minimize the chance of cracking. Allowing the body to cool at "furnace rate" (about 200° C./hour) is a generally followed procedure.

As noted, thermal aging of the zirconia bodies at a temperature of 1000°–1200° C. is necessary to provide the desired levels of monoclinic zirconia in the bodies and to provide the excellent thermal shock resistance of the present invention. Generally, the bodies are thermally aged for 10–150 hours. Accordingly, where the optional aging of step (d) is not introduced, or where that aging proceeds for a period less than 10 hours, the body is re-heated in step (f) to a temperature of 1000°–1200° C. and aged at that temperature for an additional period of time. Following this, the body is again cooled to room temperature at furnace rate.

It is not critical whether the thermal aging is performed during cooling step (d) or is introduced as the separate re-heating step (f) now described so long as the zirconia bodies receive a total of about 10–150 hours of thermal aging at 1000°–1200° C. The number of hours of thermal aging necessary to provide the "low" or "high" monoclinic forms of the zirconia bodies of this invention will depend, in part, on the rates at which cooling steps (c) and (d) were performed. In general, when cooling steps (c) and (d) are performed at the preferred rates of about 200°–450° C./hour and 75° C./hour, respectively, the "low" monoclinic zirconia is developed after about 10–20 hours of thermal aging and the "high" monoclinic formed after about 20–80 hours.

It is to be understood that the thermal aging in the temperature range of 1000°–1200° C. does not require that the body be held at a specific temperature in that range for the aging period. The temperature may fluctuate or decrease within the range, such as by slow cooling from 1000° C. to 1200° C., so long as the body is within the 1000°–1200° C. range for 10–150 hours. The thermal aging of the zirconia materials of this invention makes them particularly useful as dies in the high temperature forming of metals and alloys, where strength and thermal shock resistance are important. For example, in the processing of copper alloys, pre-heated billets in the form of cylinders (5-inch diameter by 30-inch length), are extruded at 750° C. through zirconia dies to form half-inch diameter rods. The typical failure mode of such dies is development of cracks near the die throat, which result in "fins" on the extruded material, making the die useless thereafter. Dies made from the high-monoclinic zirconia of this invention, having been thermally-aged as described for at least about 20 hours, do not develop cracks and can generally withstand up to 180 extrusions. The lower monoclinic materials generally withstand only 50–100 extrusions.

Zirconia materials of the compositions described herein that are not thermally aged, however, are also useful in many applications. For example, where no thermal aging is introduced during cooling step (d), zirconia bodies removed from the furnace after reaching room temperature according to step (e) contain less than about 10 volume percent of monoclinic zirconia, generally about 5 volume percent. This unaged form has good low temperature properties, and is normally suitable for end-use applications in which the zirconia body is not subjected to rapid and extreme temperature fluctuations. More particularly, this low-monoclinic form has a toughness of above about 8 MPA.m$^{.5}$ at room temperature and above about 3 MPa.m$^{.5}$ at 800° C. The modulus of rupture is above about 500 MPa at room temperature but is below that level, generally about 250–400 MPa, at 800° C. These zirconia bodies have an after-firing density of above 5.5 gm/cc and a thermal expansion coefficient of greater than $95 \times 10^{-7}$/°C. over the temperature range of 25°–1000° C.

Applications for which these unaged zirconia bodies are useful are as prosthesis devices; wear-resistant lining and tiles; powder metallurgy sizing tools; mining industry scraping blades; valve, seals, and valve guides; nozzles and dies for low temperature extrusions or injections.

Throughout the specification where reference is made, unless otherwise indicated physical properties of the fired zirconia bodies are measured as follows:

Thermal expansion is measured on a bar of the product using a dilatometer. A heating rate of 3° C./minute is used over a range of room temperature to about 1000° C. using alumina as a standard.

Modulus of rupture is measured in 4-point flexure with spans of 50 mm (support span) and 13 mm (load span). MOR at room temperature is measured on a bar specimen of the fired material that has been finished with a 320 grit diamond wheel on a surface grinder to a bar size of 3 by 3 by 65 mm. MOR at 800° C. is measured on a bar specimen of the fired material that has been similarly finished to a bar size of 8 by 1.5 by 65 mm.

Toughness is measured in 4-point flexure using spans of 40 mm (support span) and 5 mm (load span). The sample is a chevron-notched fired bar of dimension 5 by 6 by 60 millimeters. The crosshead speed is 0.50 mm/minute to facilitate stable crack growth.

Density is measured by water displacement at room temperature.

The following examples are illustrative, but not limiting of, the present invention. In the examples, the zirconia used was ZIRCOA-A monoclinic powder containing the indicated amounts of SiO$_2$.

EXAMPLE 1

A batch of the following composition was made

|  | Parts by weight |
|---|---|
| ZrO$_2$ (ZIRCOA-A powder with 0.06% SiO$_2$) | 96.7 |
| MgO | 3.30 |

The batch was wet-milled with water in the presence of 1.0% by weight, based on the solids weight, of DARVAN C deflocculating agent. Milling was continued until the solids in the milled batch attained an average particle size of about 1.0 micron. About 3% by weight, based on the solids weight, of a mixture of organic binders (CARBOWAX 400 and CARBOWAX 4000, Union Carbide Corp.) was added to the batch. After sufficient mixing to disperse the binder, the batch was spray dried and pressed into test bars (8 by 10 by 80 mm).

The pressed bars were fired to a temperature of 1625° C. according to the following firing sequence: room temperature (RT) to 250° C. over a 4-hour period; hold at 250° C. for 2 hours; 250°–400° C. over a 6-hour period; hold at 400° C. for 4-hours; 400° C. to 1625° C. at 50° C./hour. The bars were held at that temperature for 2 hours and then cooled to 1400° C. at 450° C./hour followed by cooling to 1100° C. at 75° C./hour and to room temperature at a rate of 200° C./hour. The bars were then re-heated and aged at 1100° C. for 10 or 24 hours, followed by "furnace rate" (about 200° C./hour) cooling back to room temperature.

Physical properties of the test bars as a function of thermal aging are shown in the table.

TABLE

| | Example 1 | |
|---|---|---|
| | Aging Time (hours) | |
| | 10 | 24 |
| MOR at RT (MPA)* | 703 ± 14 | 572 ± 35 |
| MOR at RT (MPa); after exposure to thermal shock | 627 ± 35 | 448 ± 35 |
| MOR at 800° C. | 380 ± 20** | 420 ± 21 |
| Toughness at 800° C. (MPa · m$^{.5}$) | 3.7 | 5.0 |
| Density (gm/cc) | 5.76 | 5.68 |
| Thermal Expansion Coefficient, RT-1000° C. ($\times 10^{-7}$/° C.) | 95 | 52 |

*measured on bar finished to 8 × 1.5 × 65 mm
**estimated

It can be seen that greater MOR values for room temperature application are provided by 10-hour thermal aging; the longer aging time provided superior high temperature physical properties.

EXAMPLE 2

A batch admixture of the following composition was made:

|  | Parts by weight |
|---|---|
| ZrO₂ (ZIRCOA-A powders, with 0.06% SiO₂) | 97.00 |
| MgO | 3.00 |

The batch was wet milled with water in the presence of 0.33% by weight, based on solids weight, of Strodex PK-90 deflocculating agent. Milling continued until the solids in the milled batch attained an average particle size of about 1.1 microns. About 4% by weight, based on the solids weights, of an organic binder was added to the batch. After sufficient mixing to disperse the binder, the batch was spray dried and pressed into test bars (8 by 10 by 80 mm).

The pressed bars, following separate firing to burn out the binder, were fired to a top temperature of 1725° C. according to the following firing sequence: room temperature (RT) to 400° C. at 400° C./hour; 400° C. to 1725° C. at 50° C./hour; hold at 1725° C. for 2 hours. The cooling sequence was as follows: 1725° C. to 1400° C. at 575° C./hour; 1400° C. to 1000° C. at 130° C./hour. The samples were divided into three groups (A, B, and C) for further treatment, as follows: Samples A and C were cooled to room temperature from 1000° C. at furnace rate (about 200° C./hour), after which only group C was re-heated to 1100° C. and aged at that temperature for 22 hours, followed by furnace-rate cooling to room temperature. Group A was not re-heated (no aging). Group B was heated from 1000° C. to 1100° C. and aged at 1100° C. for 25 hours, followed by furnace-rate cooling to room temperature.

Physical properties of the test bars as a function of thermal-aging are listed in the following table. It can be seen that Sample A, which had not been aged had no thermal shock resistance, breaking immediately upon immersion in the tin bath. Samples B and C, which were aged through different procedures, display excellent thermal shock resistance.

| Properties | A | B | C |
|---|---|---|---|
| MOR at RT (MPa) | 525 | 510 | 490 |
| MOR at RT (MPa); after exposure to thermal shock | 0 | 450 | 380 |
| Toughness at RT (MPa · m$^{-5}$) | 9.2 | 13.6 | 12.6 |
| Thermal Expansion Coefficient RT-1000° C. (×10$^{-7}$/° C.) | 105 | 93 | 100 |
| Density (gm/cc) | 5.78 | 5.75 | 5.76 |

EXAMPLE 3

The following experiment was conducted to determine the effect of various silica concentrations on the physical properties of MgO-partially stabilized zirconia. Three batches, Samples A through C, having the indicated weights of silica with ZIRCOA-A powder were made:

|  | Parts by weight | | |
|---|---|---|---|
|  | A | B | C |
| ZrO₂ | 96.67 | 96.64 | 96.58 |
| MgO | 3.30 | 3.30 | 3.30 |
| SiO₂ | 0.03 | 0.06 | 0.12 |

Each sample batch was wet milled with water in the presence of 0.33% by weight, based on batch weight, of Strodex PK-90 deflocculating agent. Milling continued until the solids in the milled batch attained an average particle size of about 1.3 microns. About 4% by weight, based on the solids weights, of an organic binder was added to each batch. After sufficient mixing to disperse the binder, each batch was spray dried and pressed into test bars (8 by 10 by 80 mm).

The pressed bars were fired to a top temperature of 1675° C. according to the following firing sequence: room temperature (RT) to 250° C. over a 4-hour period; hold at 250° C. for 2 hours; 250°–400° C. over a 6-hour period; hold at 400° C. for 6-hours; 400° C. to 1675° C. at 50° C./hour; hold at 1675° C. for 2 hours. The cooling sequence was as follows: 1675° C. at 450° C./hour; 1400° C. to 1100° C. at 75° C./hour; 1100° C. to room temperature at a furnace rate of about 200° C./hour. The fired bars were re-heated and aged at 1100° C. for 20 hours.

Physical properties of the test bars as a function of silica content are listed in the table. It can be seen that variation in silica content within the indicated range has little effect on properties, and that samples B and C of the stabilized zirconia display acceptable strength and toughness even though they contain silica in amounts greater than 0.03 weight percent.

| Properties | Sample A | Sample B | Sample C |
|---|---|---|---|
| MOR at RT (MPa)* | 461 | 451 | 461 |
| MOR at 800° C. (MPa) | 338 | 322 | 287 |
| Toughness at RT (MPa · m$^{-5}$) | 8.1 | 7.7 | 8.7 |
| Toughness at 800° C. (MPa · m$^{-5}$) | 4.5 | 4.7 | 5.0 |
| Thermal Expansion Coefficient RT-1000° C. (10$^{-7}$/° C.) | 46 | 51 | 59 |
| Density (gm/cc) | 5.44 | 5.44 | 5.45 |

*measured on bar finished to 8 × 1.5 × 65 mm

EXAMPLE 4

A batch of the following composition was made

|  | Wt % |
|---|---|
| ZrO₂ (ZIRCOA-A powders, with 0.3% wt. % SiO₂) | 96.20 |
| MgO | 3.6 |
| SiO₂ | 0.2 |

The batch was processed in the manner described in Example 1, except that the top firing temperature was 1675° C. with a 2 hour hold. After cooling to room temperature according to the schedule described in Example 1, the test bars were reheated to 1100° C. and aged for 10 hours, followed by cooling to room temperature. The density of the fired samples was 5.72 gm/cc and the thermal expansion coefficient for the temperature range 25°–1000° C. was 60×10$^{-7}$/°C. The average modulus of rupture of the specimens retained after the thermal shock test was 315 MPa.

We claim:

1. A partially stabilized zirconia body formed of a molded uncalcined mixture of magnesia powder and zirconia powder containing silica, said body consisting essentially of zirconia, silica and magnesia, the silica being about 0.05–0.5% by weight of the body and the magnesia being about 2.5–4.0% by weight of the body;

said body having a crystalline microstructure consisting essentially of (1) grains of cubic stabilized zirconia comprising zirconia and a major portion of the magnesia, (2) discrete precipitates of tetragonal zirconia within the cubic grains, (3) discrete precipitates of monoclinic zirconia within the cubic grains, and (4) monoclinic zirconia at the boundaries of the cubic grains, each of said tetragonal and monoclinic precipitates having a substantially ellipsoidal shape with a long dimension of about 0.1–0.4 micron, said microstructure being about 10–20 volume percent monoclinic zirconia; and the partially stabilized zirconia material of the body having a thermal expansion coefficient over the range of 25°–1000° C. of about $(65-105) \times 10^{-7}/°C.$, and a modulus of rupture of at least about 350 MPa, measured at 25° C., after exposure to thermal shock.

2. A zirconia body of claim 1 wherein the magnesia content is about 3.0–4.0% by weight.

3. A zirconia body of claim 1 wherein the silica content of the body is about 0.05–0.25% by weight and the magnesia content is about 3.0–3.5% by weight.

4. A partially stabilized zirconia body formed of a molded uncalcined mixture of magnesia powder and zirconia powder containing silica, said body consisting essentially of zirconia, silica and magnesia, the silica being about 0.05–0.5% by weight of the body and the magnesia being about 2.5–4.0% by weight of the body;

said body having a crystalline microstructure consisting essentially of (1) grains of cubic stabilized zirconia comprising zirconia and a major portion of the magnesia, (2) discrete precipitates of tetragonal zirconia within the cubic grains, (3) discrete precipitates of monoclinic zirconia within the cubic grains, and (4) monoclinic zirconia at the boundaries of the cubic grains, each of said tetragonal and monoclinic precipitates having a substantially ellipsoidal shape with a long dimension of about 0.1–0.4 micron, said microstructure being about 20–60 volume percent monoclinic zirconia; and the partially stabilized zirconia material of the body having a thermal expansion coefficient over the range of 25°–1000° C. of about $(10-65) \times 10^{-7}/°C.$, and a modulus of rupture of at least about 250 MPa, measured at 25° C., after exposure to thermal shock.

5. A zirconia body of claim 4 wherein the magnesia content is about 3.0–4.0% by weight.

6. A zirconia body of claim 4 wherein the silica content of the body is about 0.05–0.25% by weight and the magnesia content is about 3.0–3.5% by weight.

7. A method of making a magnesia partially stabilized zirconia body with magnesia being about 2.5–4.0% by weight of the body comprising the steps of (a) preparing a molded green body by mixing magnesia powder and zirconia powder to provide an uncalcined mixture thereof containing about 0.05–0.5% by weight of silica, and molding that mixture;

(b) heating the body to a sintering temperature of about 1525°–1800° C. and optionally holding the body at that temperature for a period up to about 20 hours;

(c) cooling the body to a first cooling temperature of about 1300°–1450° C. at a rate of 200°–600° C./hour;

(d) cooling the body to a second cooling temperature of about 1000°–1200° C. at a rate of 20°–200° C./hour;

(e) aging the body at 1000°–1200° C. for a period of about 10–150 hours; and (f) cooling the body to room temperature at a rate up to about 400° C./hour.

8. A method of claim 7 wherein step (a) includes the steps of wet-milling the powders to an average particle size of about 0.5–2.0 microns and pressing the powders into a shape.

9. A method of claim 7 wherein
(1) the magnesia content of the body is about 2.5–4.0% by weight;
(2) cooling step (c) is performed at a rate of 200°–450° C./hour;
(3) cooling step (d) is performed at a rate of about 50°–100° C./hour; and
(4) cooling step (f) is performed at a rate of about 200°–300° C./hour.

10. A method of claim 9 wherein aging step (e) is performed for 10–20 hours.

11. A method of claim 9 wherein aging step (e) is performed for 20–80 hours.

12. A method of claim 9 wherein the first cooling temperature is about 1400° C. and the second cooling temperature is about 1100° C.

13. A method of claim 7 in which aging step (e) comprises the sub-steps of
(i) aging the body at 1000°–1200° C. for a first period of time;
(ii) cooling the body to room temperature at a rate up to about 400° C./hour; and
(iii) re-heating the body to a temperature of 1000°–1200° C. and further aging the body at that temperature for a second period of time such that the totals of said first and second periods is about 10–150 hours.

14. A method of claim 7 which includes the additional steps of cooling the body to room temperature at a rate of up to about 400° C./hour and re-heating the body to a temperature of 1000°–1200° C. prior to performing aging step (e).

15. A method of claim 14 wherein
(1) cooling step (c) is performed at a rate of 200°–450° C./hour; and
(2) cooling step (d) is performed at a rate of about 50°–100° C./hour.

16. A method of claim 14 wherein aging step (e) is performed for 10–20 hours.

17. A method of claim 14 wherein aging step (e) is performed for 20–40 hours.

18. A method of claim 15 wherein the first cooling temperature is about 1400° C. and the second cooling temperature is about 1100° C.

* * * * *